United States Patent
Jorgenson et al.

(10) Patent No.: US 11,552,662 B1
(45) Date of Patent: Jan. 10, 2023

(54) METHOD FOR IMPROVING DETECTION IN MULTIPATH CHANNELS

(71) Applicant: Rockwell Collins, Inc., Cedar Rapids, IA (US)

(72) Inventors: Mark B. Jorgenson, Kanata (CA); Robert W. Johnson, Ottawa (CA)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/461,313

(22) Filed: Aug. 30, 2021

(51) Int. Cl.
*H04B 1/10* (2006.01)
*H04B 7/12* (2006.01)
*H04L 25/03* (2006.01)

(52) U.S. Cl.
CPC ............ *H04B 1/1081* (2013.01); *H04B 7/12* (2013.01); *H04L 25/03101* (2013.01); *H04L 25/03159* (2013.01)

(58) Field of Classification Search
CPC ... H04B 1/1081; H04B 7/12; H04L 25/03101; H04L 25/03159
See application file for complete search history.

(56) References Cited

U.S. PATENT DOCUMENTS

| | | | |
|---|---|---|---|
| 4,639,937 A | 1/1987 | McRae et al. | |
| 5,231,648 A | 7/1993 | Driedger et al. | |
| 5,790,598 A | 8/1998 | Moreland et al. | |
| 6,370,397 B1 | 4/2002 | Popović et al. | |
| 6,868,276 B2 | 3/2005 | Nissilä | |
| 7,058,399 B2 | 6/2006 | Klein et al. | |
| 8,064,507 B1 * | 11/2011 | Cheng | H04B 7/01 375/340 |
| 8,442,103 B2 | 5/2013 | Krishnamurthy | |
| 2008/0130674 A1 | 6/2008 | Ahmed-Ouameur et al. | |

(Continued)

FOREIGN PATENT DOCUMENTS

| | | |
|---|---|---|
| GB | 2353181 A | 2/2001 |
| WO | 2009107071 A3 | 10/2009 |

OTHER PUBLICATIONS

Vaseghi, Saeed V., "Linear Prediction Models", Advanced Signal Processing and Noise Production, Second Edition, published in 2000, pp. 227-262.

*Primary Examiner* — Sung S Ahn
(74) *Attorney, Agent, or Firm* — Suiter Swantz pc llo (57) ABSTRACT

A system for receiving multipath signals is disclosed. The system includes an equalizer that includes an input for a received data signal, wherein the received data comprises a first multipath component and a second multipath component. The equalizer further includes a channel impulse response estimator coupled to the input configured to determine one or more channel impulse response (CIR) estimates for the first multipath component and the second multipath component. The equalizer further includes a statistical estimation module coupled to the channel impulse response estimator configured to estimate a state of the first multipath component and the second multipath component based on the one or more channel impulse response estimates. The equalizer further includes a detector coupled to the statistical estimation module configured to detect data from the received data signal based on an estimated future state of the first multipath component and the second multipath component.

15 Claims, 7 Drawing Sheets

308

(56) References Cited

U.S. PATENT DOCUMENTS

| | | | |
|---|---|---|---|
| 2013/0121392 A1* | 5/2013 | Thompson | H04L 27/2647 375/232 |
| 2019/0097859 A1* | 3/2019 | Bala | H04L 27/26132 |
| 2019/0098507 A1 | 3/2019 | Yang et al. | |

* cited by examiner

METHOD FOR IMPROVING DETECTION IN MULTIPATH CHANNELS

BACKGROUND

Radio signal transmissions often become dispersed into multiple signals that arrive at a receiver at different times. For example, a radio signal may be split into a non-impeded beam, and a beam that bounced off of an RF reflective surface, with the reflected beam arriving at the receive at a later time that the non-impeded beam. In another example, an originating node may send an RF signal to two different relay nodes, resulting in the signal being received by a receiving node at different times based on the differences in distance of each relay node to the originating node and the receiving node. These multipath signals require specialized receiver equipment, such as equalizers, to demodulate the signal and resolve the original message.

Most modern high-performance equalizers break down the demodulation of a multipath signal through two mechanisms, where a channel impulse (CIR) estimate is first determined, then, based the CIR estimate, the data symbols from the signal are determined. For determining a CIR estimate in a fading multipath channel, the usual approach is to derive CIR estimates from the received signal, either from known signal components in the transmission such as probe or pilot symbols (e.g., within a decision block), or from detected symbols, or a combination of both approaches. Equalization approaches that incorporate time-varying CIRs into the detection have been developed where estimates of CIR before and after a data segment are developed and the CIR is modelled as changing smoothly from the prior CIR to the subsequent CIR.

When a multipath transmission originates from a single source, a frequency offset can usually be reduced to a low level by globally correcting the received signal for an estimated frequency offset. In some cases, when propagation results in time dispersion, accompanied by differing frequency offsets for the multipath components, a global frequency offset correction may still result in substantial residual frequency offsets for discrete multipath components. This is even more likely to be problematic with transmit diversity approaches like Avalanche relay, where the artificially created multipath components arise from separate relay transmitters, each of which may have different frequency offsets from individual Doppler or clock offsets.

An approach that may be used when constructing the mathematical model for incorporating time-variability of the CIR in the detection process is to initially assume that the taps of the impulse response vary linearly from an initial estimate to a final estimate. That is, anywhere that a channel estimate is used, it is constructed by incorporating values from the initial and final channel impulse response estimates in inverse proportion to their distance (e.g., in samples) from the location of the estimate. However, this method does not perform well when there is a substantial residual frequency offset component that is variable depending on the multipath delay, which may occur under relay conditions. Accordingly, there is a need for a more accurate method for determining the CIR estimate for these problematic diversity approaches than current methods.

SUMMARY

A system is disclosed. In one or more embodiments, the system includes an equalizer. In one or more embodiments, the equalizer includes an input for a received data signal. In one or more embodiments, the received data comprises a first multipath component and a second multipath component. In one or more embodiments, the equalizer includes a channel impulse response estimator coupled to the input configured to determine one or more channel impulse response (CIR) estimates for the first multipath component and the second multipath component. In one or more embodiments, the equalizer includes a statistical estimation module coupled to the channel impulse response estimator configured to estimate a state of the first multipath component and the second multipath component based on the one or more channel impulse response estimates. In one or more embodiments, the equalizer includes a detector coupled to the statistical estimation module configured to detect data from the received data signal based on an estimated future state of the first multipath component and the second multipath component.

In one or more embodiments of the system, the statistical estimation module comprises a Kalman tracking filter In one or more embodiments of the system, the statistical estimation module comprises a prediction error filter.

In one or more embodiments of the system, the prediction error filter is configured to estimate a future state of the first multipath component and the second multipath component.

In one or more embodiments of the system, the prediction error filter is configured to estimate the future state of the first multipath component and the second multipath component based on two or more preceding CIR estimates for each of the first multipath component and the second multipath component.

In one or more embodiments of the system, the first multipath component and the second multipath component vary in frequency.

In one or more embodiments of the system, the system further includes a diversity combiner configured to receive a plurality of data signals.

In one or more embodiments of the system, the system further includes a receiver configured to provide the received data to the equalizer.

In one or more embodiments of the system, the first multipath component and a second multipath component are received from two different sources.

In one or more embodiments, the statistical estimation module is further configured to estimate a state of the first multipath component and the second multipath component based on two or more channel impulse response estimates.

A method for detecting a received data signal having a first multipath component and a second multipath component is also discloses. In one or more embodiments, the method includes generating one or more CIR estimates for each of the first multipath component and the second multipath component. In one or more embodiments, the method includes generating a deterministic characteristic of the CIR of the first multipath component and the second multipath component. In one or more embodiments, the generating a deterministic characteristic of the CIR of the first multipath component and the second multipath component includes determining, via an error residual of the estimated the state of the first multipath component and the second multipath component, at least one of an estimation of the first multipath component and the second multipath component, or a coefficient of the estimated state of the first multipath component and the second multipath component that indicate the deterministic characteristic of the CIR estimate for the first multipath component and the second multipath component. In one or more embodiments, the method includes detecting data symbols from the received data signal based on the deterministic characteristic of the channel impulse response estimate for the first multipath component and the second multipath component.

In one or more embodiments of the method, the method further includes generating a frequency offset correction of the received data signal.

In one or more embodiments of the method, the error residual is determined via a Kalman tracking filter In one or more embodiments of the method, the error residual is determined via a prediction error filter.

In one or more embodiments of the method, the first multipath component and a second multipath component vary in frequency.

In one or more embodiments of the method, the method further includes forming a data block from the received signal.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A system and method for resolving a multipath signal is disclosed. The system includes an equalizer having an input for receiving a data signal, a channel impulse response estimator that determines a CIR estimate for each component or path of the multipath signal, and a model of the time-varying evolution of a CIR, such as a prediction error response filter estimator, configured to model the evolution of the CIR based on a history of CIR estimates. This model determination optimizes the statistical estimate of the CIR within an interval of interest. The system also includes a detector configured to detect and resolve data symbols from the signal via the CIR estimator and the prediction error response filter estimator.

Figure 1:
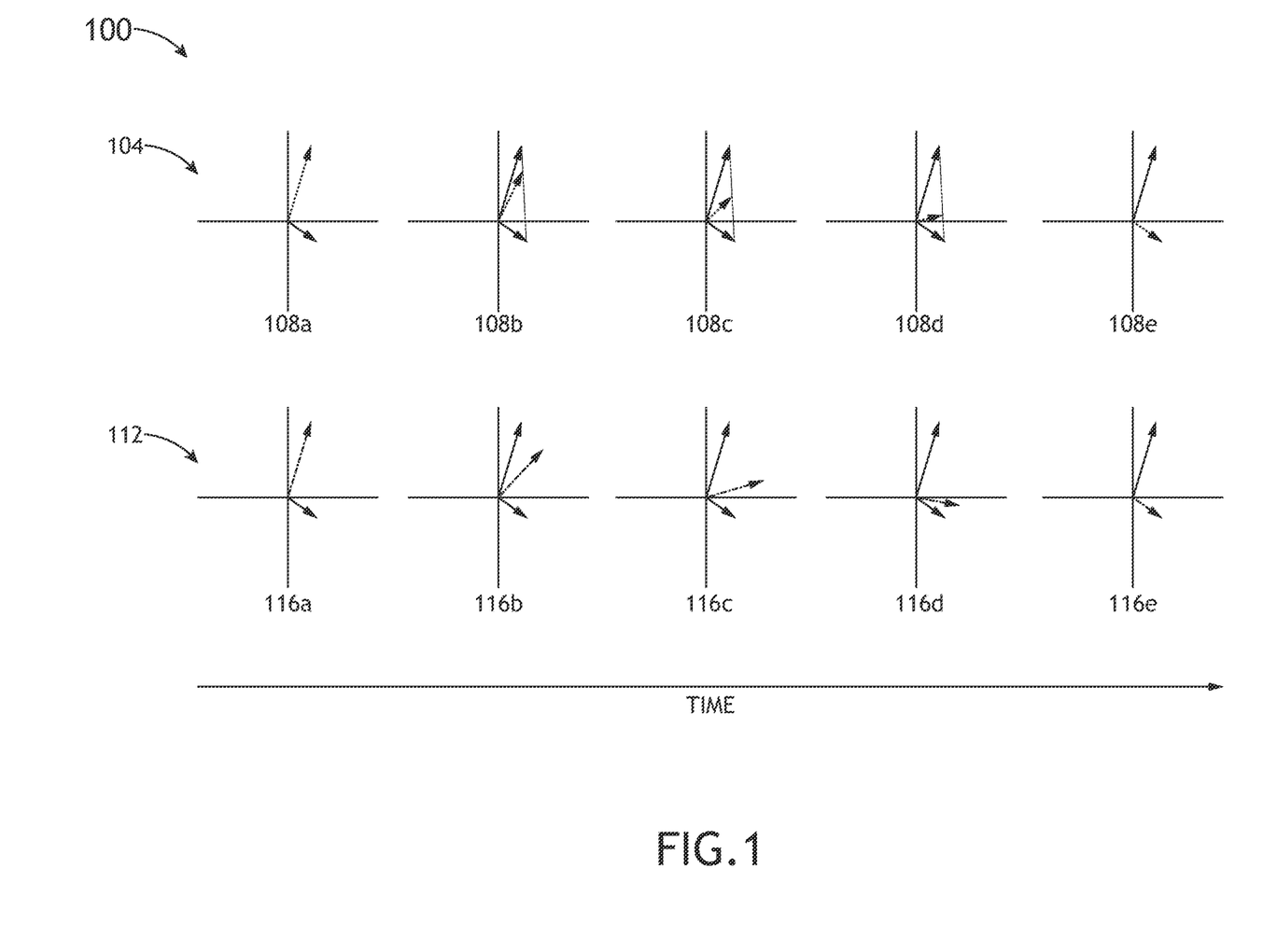
FIG. 1 is a series of graphs illustrating the evolution of one component of the channel impulse response from an initial amplitude and phase to a final amplitude and phase, In one or more embodiments of the disclosure.

Within the system and method, the time-variability of the elements of the CIR may be modeled by assuming the evolution of an initial state to a final state follows a trajectory where the phase changes linearly with time, with the rate of change in phase related to the frequency offset, and with the magnitude changing linearly across the interval. This is in contrast to previous CIR estimate algorithms that assume that the taps of the impulse response vary linearly from the initial estimate to the final estimate. Examples of these changes from the initial state to the final state are shown in FIG. 1, in accordance with one or more embodiments of the disclosure.

As shown in a first series 104 of phase graphs 108a-e (e.g., with amplitude included, presented as the length of the arrow), the graphs 108a-e describe a component of the channel impulse response in the traditional interpolation algorithm. In this first series 104, the channel response, marked as an outlined arrow, changes linearly in both amplitude and phase from an initial state (e.g., graph 108a) to a final state (e.g., graph 108e). The channel response in the intermediate states (e.g., graphs 108b-d) particularly show a linear progression from the initial state to final state.

As shown in a second series 112 of amplitude/phase graphs 116a-e, the graphs 116a-e describe a component of the channel impulse response in the using a prediction algorithm of the current disclosure, which models the evolution of the channel impulse response with constant rates of change and amplitude. Although the initial state (e.g., graph 116a) and the final state (116e) of the component of the channel impulse response are identical to the initial state and final state of the first series 104, the intermediate states (e.g., graphs 116b-d) of the component of the channel impulse response of the second series 116 are quite different to that of the first series 104.

The differences between the first series 104 and the second series 116 suggest that the two models may produce significantly different estimated amplitudes and phase estimates at different time points. For example, in the case where phase changes based on a frequency offset, phase will vary linearly with time. However, when the impulse response is assumed to vary linearly from initial to final estimate (e.g., graph 116a to graph 116e), the rate of change of phase will not normally be constant. For instance, in a situation where the channel impulse response is constant, but the signal has a fixed frequency offset, the channel impulse response may incur a constant rate of change of phase, and a circular trajectory. For this situation, the rate of change of phase estimate using a linear interpolation of the impulse response between and initial and final time points (e.g., first series 104) will under estimate the change in the beginning and the end of the trajectory, and overestimate the change in phase during the intermediate time periods.

The under estimate of the change in the beginning and the end of the trajectory, and overestimate in the change in phase during the intermediate time periods may result in a situation where modulations that are not dependent on amplitude are affected by the choice of an inaccurate model. The accuracy of the prediction algorithm of the current disclosure is particularly greater than the traditional interpolation algorithm as the rate of change of the channel results in substantial variation between time points.

Figure 2:
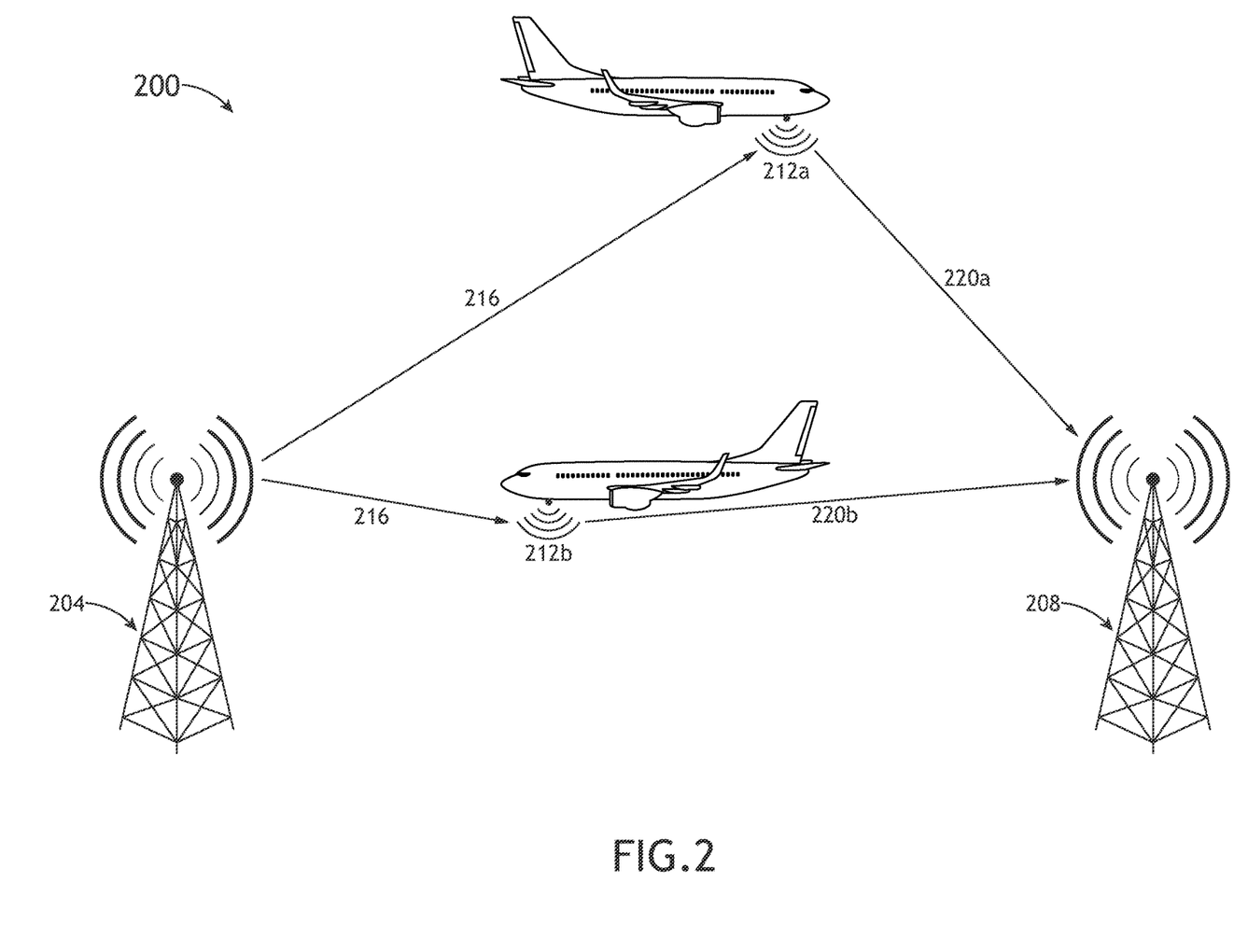
FIG. 2 illustrates a diagram of a mobile ad hoc network, in accordance with one or more embodiments of the disclosure.

FIG. 2 illustrates a diagram of a mobile ad hoc network 200. in accordance with one or more embodiments of the disclosure. The ad hoc network 200 may contain an originating node 204, a node 208, and one or more relay nodes 212a-b. The ad hoc network may contain any number of mobile or nonmobile originating nodes, receiving nodes 208, and/or relay nodes 212a-b. The originating node 204 may send a first signal 216 to the two or more relay nodes 212a-b, which in turn send a plurality of multipath components (e.g., first multipath component 220a and second multipath component 220b) to the receiving node 208. This arrangement is similar to the avalanche relay technique described in U.S. Pat. No. 4,639,937 entitled "HF avalanche relay communication technique" published on Jan. 27, 1987 by McRae, which is incorporated by reference in its entirety. The first multipath component 220a and the second multipath component 220b may have different time, frequency, phase, and amplitude characteristics between each other due to the distance, Doppler effects, clock offsets, and other confounding variables, and therefore may have time-varying CIRs. For example, the first multipath component and a second multipath component may vary in time. In another example, the first multipath component and a second multipath component may vary in frequency. In another example, the first multipath component and a second multipath component may vary both time and frequency.

Each time-varying CIR multipath component, such as for the first multipath component 220a and the second multipath component 220b, may be modeled as having some degree of predictability which can be ascertained from a time series of CIR estimates using a prediction algorithm using a time series of CIR estimates which may provide a more accurate model of the CIR as it evolves with time than interpolation algorithms. This estimate may decrease the differences between the estimated CIR and the real CIR, as the real CIR changes with time.

Referring back to FIG. 2, where the first multipath component 220a and the second multipath component 220b are sufficiently separated in delay that each path can be resolved, each path may have different fading characteristics (e.g., Doppler spread) and frequency offset (e.g., Doppler shift and oscillator offsets). If both paths have the same frequency offset, a receiver may compensate with a global frequency offset correction. However, if the frequency offsets differ, then a global frequency offset correction will not remove these frequency offset aspects, which can affect downstream functions, such as symbol detection.

With fixed frequency offsets, the phase change due to the frequency offset for a known change in time, and is generally predictable, and this prediction may be accurately estimated from an evaluation of a time series of CIR estimates. A pure frequency offset would correspond to a CIR component with a fixed magnitude and a constant rate of change of phase with time, which would be predictable using a single complex coefficient, which may be determined from the time series of CIR estimates. A time evolution of a channel that is characterized by finite Doppler spread may also exhibit a degree of predictability, and that predictability may also be determined from successive CIR estimates to improve the estimation of the CIR, which may then be exploited during detection.

Figure 3:
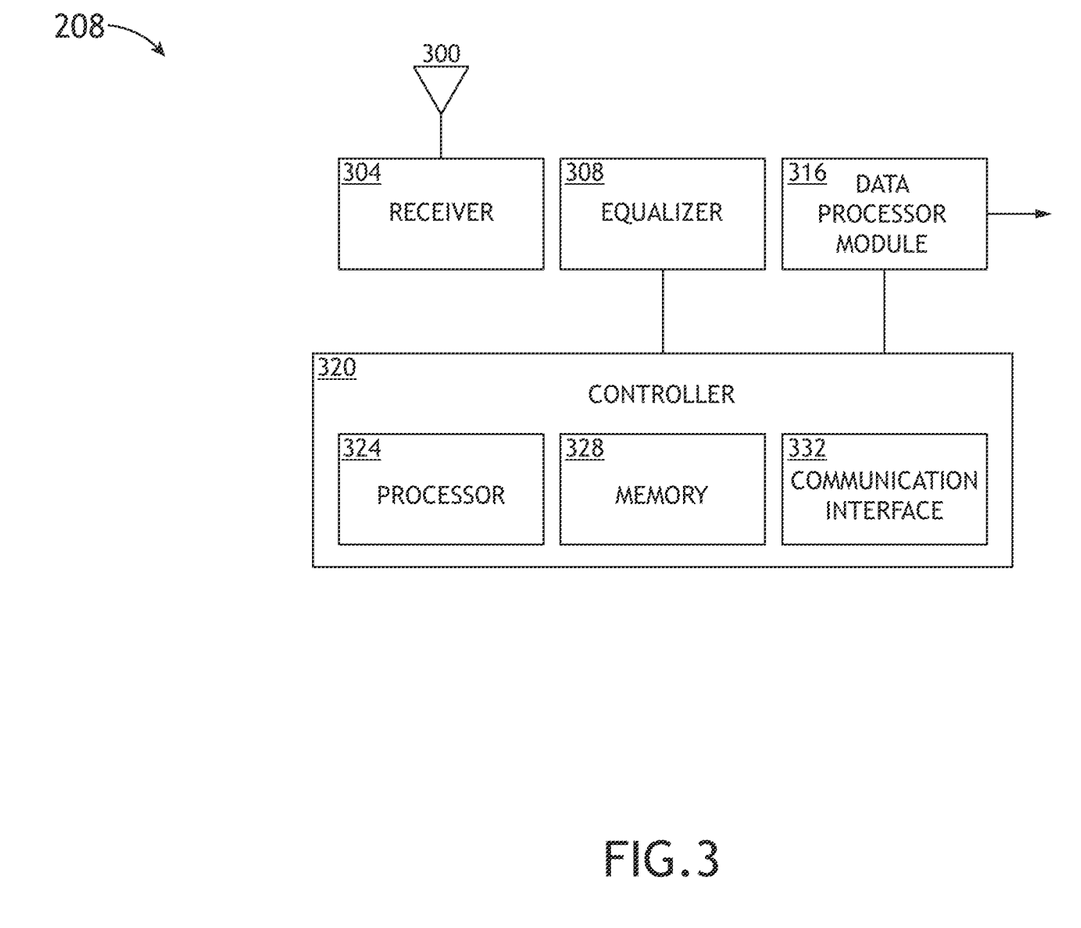
FIG. 3 a block diagram illustrating a receiving node, in accordance with one or more embodiments of the disclosure.

FIG. 3 is a block diagram illustrating the receiving node 208, in accordance with one or more embodiments of the disclosure. The receiving node 208 is configured to receive multipath signals as described herein, and in some instances may transmit signals and/or relay signals. The receiving node 208 may be configured as a computer node element that may include a switch, network storage device, chassis, server, data center, network attached device, non-volatile memory (NVM) storage device, cloud-based server and/or storage system, etc. The receiving node 208 may also include any componentry as described in U.S. Pat. No. 5,790,598 entitled "Block Decision Feedback, Equalizer", filed on Mar. 1, 1996 by Moreland, which is incorporated by reference in its entirety. In particular, the receiving node 208 may include an antenna that received the transmitted signal via multiple paths and provides the received signal to a receiver 304.

In embodiments, the receiver 304 processes the received signal (e.g., filters, amplifies, or frequency downconverts), and directs the received signal to an equalizer 308. The equalizer 38 performs equalization on the received signal as described herein, and determines data symbols from the received signal. The signal is then outputted to a data processor module 316 for further processing (e.g., the data processor module acting as a detector of symbols within the processed signal). The receiving node 208 includes a controller 320 configured to provide processing functionality for the receiving node 208 and components (e.g., the receiver 304, the equalizer 308, and the data processor module 316). The equalizer 308 may also include a buffer for storage of data symbols (e.g., probe sequence symbols) and/or a diversity combiner configured to receive a plurality of data signals from a two or more diverse paths and/or channels, as detailed in Moreland.

In embodiments, the system may include or be incorporated with any type of equalization componentry or equalization technique. For example, the system may include any type of digital equalization including but not limited to decision feedback equalization (e.g., block decision feedback estimation), linear equalization (minimum mean square error (MMSE) equalization or zero forcing equalization), blind equalization, adaptive equalization, Viterbi equalization, Turbo equalization, and BCJR equalization. In another example, the system may include any type of analog equalization componentry including but not limited to a Zobel network, a lattice phase equalizer, and a bridged "T" delay equalizer.

Due to processing power, time and power input limitations, estimates of a multipath CIR are typically performed for blocks of symbols, rather than for each symbol. For example, many equalizers use a single CIR estimate in the detection of a block of data. The estimate may eventually be updated, or the estimate may be further derived from more than one CIR estimate. In another example, the equalizer may incorporate a time-varying channel impulse response, derived from an estimate before and an estimate after a block of data to be detected, as in Moreland. For instance, the time-varying impulse response at each sub-block or sample may be presented as a linear interpolation of the estimate before and after the data block. In particular, the time-varying nature of the channel is characterized as something that changes linearly from the set of complex coefficients representing the first impulse response estimate to the set of complex coefficients representing the second channel impulse response estimate. As described herein, the system (e.g., receiving node 208) incorporated an estimation model, determined from the data, into the detection process. This estimation model provides better CIR estimates than the interpolation model, particularly under conditions as noted previously that don't align with the usual model where there is little or no predictability in the evolution of the CIR over time.

The controller 320 includes one or more processors 324 (e.g., micro-controllers, circuitry, integrated circuits, field programmable gate arrays (FPGA), or other processing systems), and resident or external memory 328 for storing data, executable code, and other information. The controller 320 can execute one or more software programs embodied in a non-transitory computer readable medium (e.g., memory 328) that implement techniques described herein. The controller 320 is not limited by the materials from which it is formed or the processing mechanisms employed therein and, as such, can be implemented via semiconductor(s) and/or transistors (e.g., using electronic integrated circuit (IC) components), and so forth.

The memory 328 can be an example of tangible, computer-readable storage medium that provides storage functionality to store various data and/or program code associated with operation of the controller 320, such as software programs and/or code segments, or other data to instruct the controller 320, and possibly other components of the receiving node 208. Thus, the memory 328 can store data, such as a program of instructions for operating the receiving node 208, including its components (e.g., controller 320), and so forth. It should be noted that while a single memory 328 is described, a wide variety of types and combinations of memory 328 (e.g., tangible, non-transitory memory) can be employed. The memory 328 can be integral with the controller 320, can comprise stand-alone memory, or can be a combination of both. Some examples of the memory 328 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The controller 320 includes a communication interface 332. The communication interface 332 can be operatively configured to communicate with components of receiver node 208 and controller 320. For example, the communication interface 332 can be configured to retrieve data from the controller 320 or other components, transmit data for storage in the memory 328, retrieve data from storage in the memory 328, and so forth. The communication interface 332 can also be communicatively coupled with the controller 320 to facilitate data transfer between components receiver node. It should be noted that while the communication interface 332 is described as a component of the controller 320, one or more components of the communication interface 332 can be implemented as external components communicatively coupled to the controller 320 via a wired and/or wireless connection.

The equalization techniques described herein may be used for various communication systems such as CDMA, TDMA, FDMA, orthogonal frequency division multiple access (OFDMA), and single-carrier FDMA (SC-FDMA) systems. A CDMA system may implement one or more radio access technologies (RATs) such as cdma2000, Wideband-CDMA (W-CDMA), and so on. cdma2000 covers IS-2000, IS-856, and IS-95 standards. A TDMA system may implement a RAT such as Global System for Mobile Communications (GSM). These various RATs and standards are known in the art.

Figure 4:
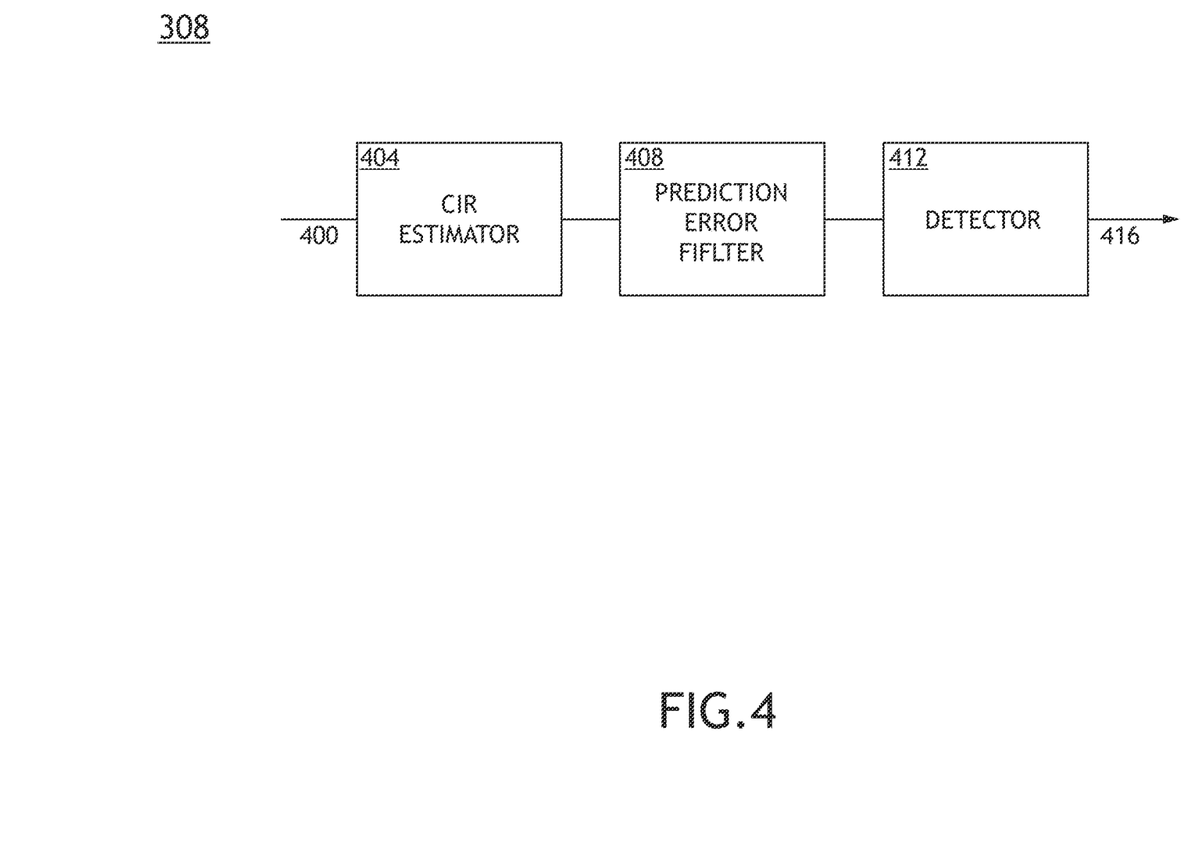
FIG. 4 is a block diagram illustrating an equalizer, in accordance with one or more embodiments of the disclosure.

FIG. 4 is a block diagram illustrating the equalizer 308, in accordance with one or more embodiments of the disclosure. The equalizer 308 includes an input 400 for receiving the data signal from the receiver 304. In some embodiments, the equalizer 308 further includes a CIR estimator 404 coupled to the input 400. The CIR estimator is configured to determine the CIR estimate for each component of the data signal (e.g., the first multipath component 220a and the second multipath component 220b). The equalizer 308 may further include a statistical estimation technique/module, such as a prediction error filter 408, coupled to the CIR estimator 404. The prediction error filter 408 is configured to model the evolution of the CIR based on a history of CIR estimates, which optimizes a statistical estimate of the CIR within an interval of interest for estimating multiple components of the data signal (e.g., the first multipath component 220a and the second multipath component 220b). The equalizer 308 may further include any number of taps and/or filters in order to accommodate any number of paths within the multipath signal.

It should be understood that the statistical estimation techniques, such as the prediction error filter 408, are not being used to make estimates, and not a prediction, as the model obtained from the statistical estimate technique will be used to determine CIR estimates based on an estimate or estimates of the CIR following a data block being detected, together with a history of channel impulse response estimates to the data block being detected. The prediction error filter 408 is one of several approaches used to determine the model. For example, the statistical estimation technique may include a Kalman tracking filter.

In some embodiments, the equalizer further includes a detector 412 coupled to the prediction error filter 408 configured to detect data (e.g., symbols) from the filtered data signal (e.g., from the received data signal based on the estimated CIR of the first multipath component 220a and the second multipath component 220b), before directing the data signal to an output 416. The detector 412 may be configured as any type of symbol detector including but not limited to a block detector. For example, the block detector may be configured as the block detector described by Moreland.

Figure 5A:
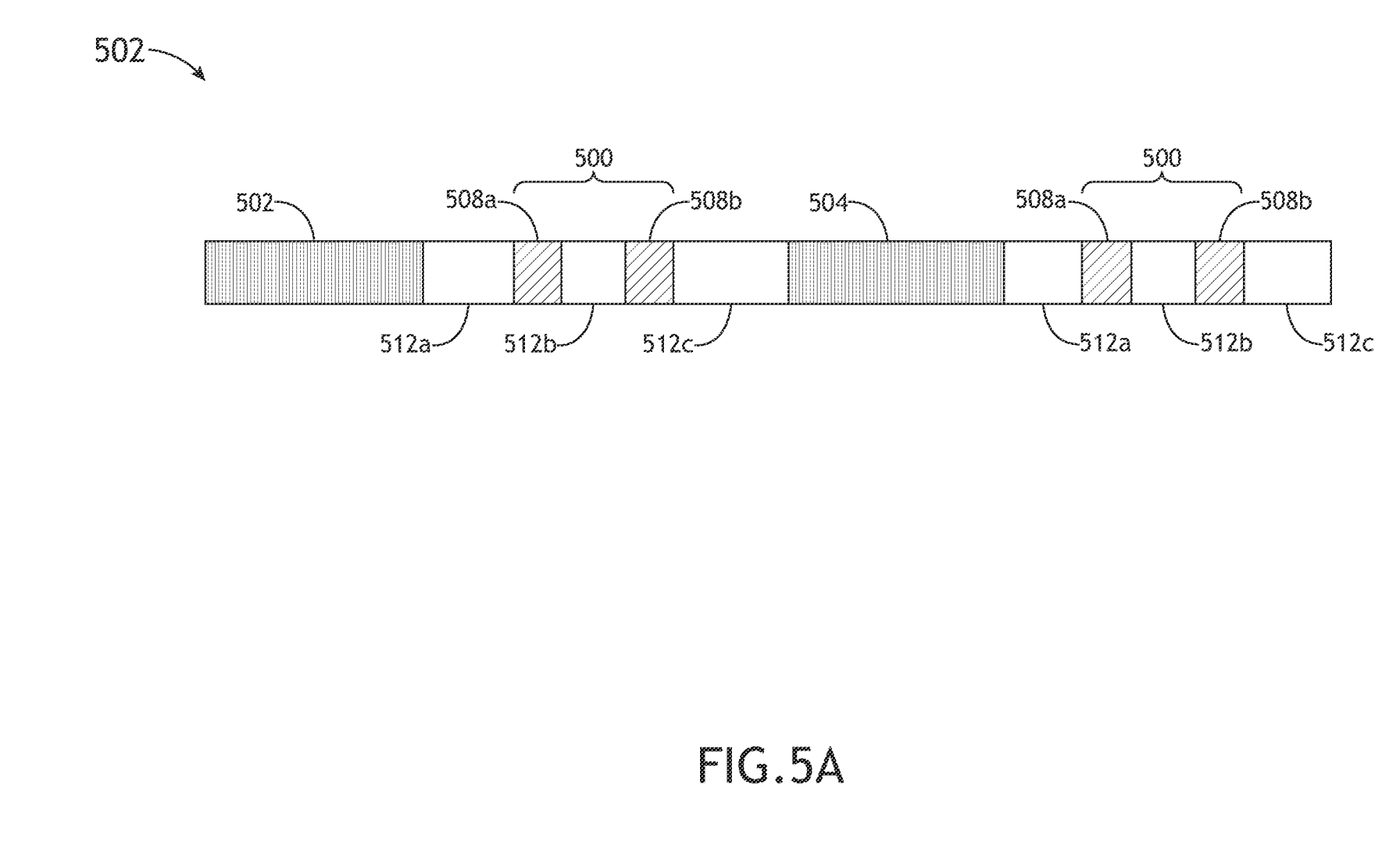
FIG. 5A-B are block diagrams illustrating two data blocks 500 concatenated within a data transmission 502, in accordance with one or more embodiments of the disclosure.
Figure 5B:
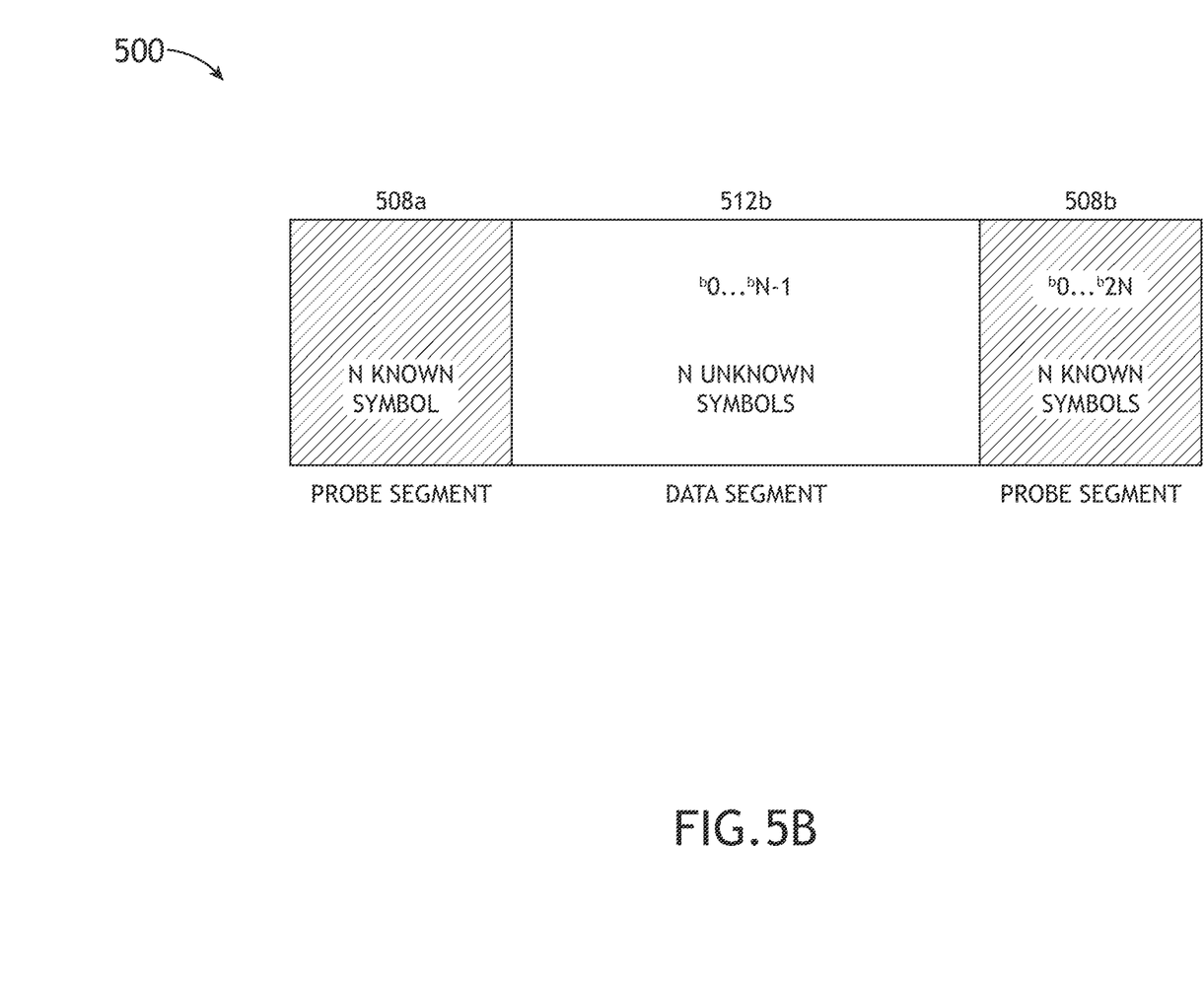

FIG. 5A-B are block diagrams illustrating two data blocks 500 concatenated within a data transmission 502, in accordance with one or more embodiments of the disclosure. The transmission of digital data through time-varying multipaths often require the insertion of known data sequences or probe segments containing large segments of known data within the data, such as preambles 504 and probe segments 508a-b) interspersed with unknown data (e.g., data segments 512). The data transmission 502 may include any number of data blocks 500. The formation of data blocks 500 (e.g., detection blocks) from the received signal, as well as the estimate of symbols (e.g., data symbols), diversity combining, and other aspects of multipath reception and symbol detection may be established as detailed in Moreland.

As show in FIG. 5B, the probe segments 508a-b contain known symbols that may be used to generate a CIR estimate. CIR estimates may be performed on probe segments 508a-b located on adjacent sides of the data segment 512a-c. For example, the probe segment 508a may contain probe segments that are interpreted by the CIR estimator 404 to generate an initial CIR estimate (e.g., correlative to graph 112a). The probe segment 508b may then contain probe segments that are interpreted by the CIR estimator 404 to generate a final CIR estimate (e.g., correlative to graph 112e). This equalizer 308 then uses the value of the CIR estimates of both sides of the probe segments 508a-b to estimate the CIR at multiple points within the data block segment 512b.

Any combination of CIR estimates generated by the probe segments 508a-b may be used for estimating the CIR estimate within any of the data segments 512a-c. For example, and as aforementioned, the CIR estimates from probe segments 508a-b immediately adjacent to the data segment 512b may be used for estimating the CIR estimate within the data segment 512b. In another example, two or more preceding CIR estimates (e.g., from probe segments 508a-b) may be used to estimate the CIR estimate of the data segment 512c. In another example, two or more subsequent CIR estimates (e.g., from probe segments 508a-b) may be used to estimate the CIR estimate of the data segment 512a. In another example, one or more preceding CIR estimates and one or more subsequent CIR estimates may be used to estimate the CIR estimate of the data segment 512a-c. In particular, the use of multiple time-varying CIR estimates to estimate the future CIR of data segments will allow bandwidth efficient waveforms to be used when large differential frequency offsets for different multipath delays are present, either from transmit diversity or natural propagations.

The statistical estimation technique used for evaluating the deterministic aspects of each multipath component, such as the prediction error filter 408, may use any componentry, software, and/or algorithm for processing data to estimate CIR within the data segment 512a-c. For example, the prediction error filter 408 may be used to process signals/data from fading signal components, the fading may be modeled on each tap as a complex multiplier with the value of the complex multiplier driven by I and Q coefficients derived from the output of Gaussian filters with white noise inputs. For instance, a two-sigma bandwidth of the Gaussian filters may define the Doppler spread of the fading tap. In this manner, the Gaussian filter may impose a degree of estimation on the evolution of the CIR with time. This degree of predictability may be used to improve demodulation of signals as they are processed. Prediction error filters, as well as other statistical error techniques are further described by Vaseghi in pages 227-262 of "Advanced Signal Processing and Noise Production" published in 2000, which is incorporated by reference in its entirety.

Figure 6:
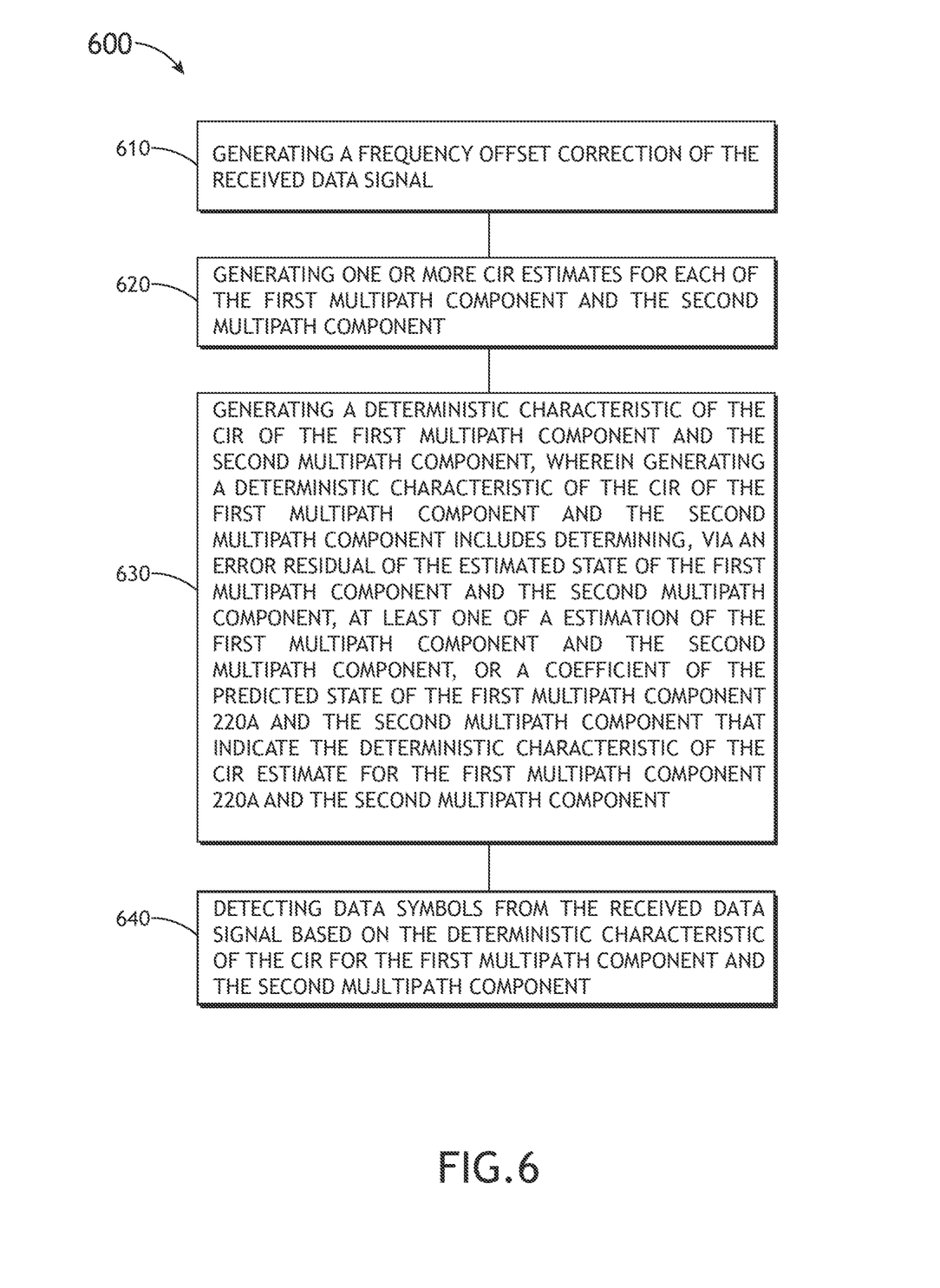
FIG. 6 is a flow diagram illustrating a method for detecting a received data signal having a first multipath component and a second multipath component, in accordance with one or more embodiments of the disclosure.

FIG. 6 is a flow diagram illustrating a method 600 for detecting a received data signal having a first multipath component and a second multipath component, in accordance with one or more embodiments of the disclosure. The received data signal may be derived from any type of wireless communication technology including but not limited to RF, microwave transmission, cellular networks, Bluetooth, Wi-Fi, ZigBee, UWB, and IR.

In some embodiments, the method 600 includes a step 610 of generating a frequency offset correction of the received data signal. Frequency offset correction may be reduced substantially by globally correcting the received signal for the estimated frequency offset. However, a global frequency offset correction may still result in substantial residual frequency offsets for multipath components, particularly of each multipath has differing frequency offsets.

In one or more embodiments, the method includes a step 620 of generating one or more CIR estimates for each of the first multipath component 220a and the second multipath component. As described herein, CIR estimates may be derived from any known data sequence, such as probe segments 508a-b, that are incorporated into the data transmission 502. Any number or combination of CIR estimates may be generated for the prediction of a data segment CIR estimate, as described herein.

In one or more embodiments, the method further includes a step 630 of generating a deterministic characteristic (e.g., estimate) of the CIR of the first multipath component 220a and the second multipath component 220b, wherein generating a deterministic characteristic of the CIR of the first multipath component 220a and the second multipath component 220b includes determining, via an error residual of the predicted the state of the first multipath component 220a and the second multipath component 220b, at least one of an estimation of the first multipath component 220a and the second multipath component 220b, or a coefficient of the estimated state of the first multipath component 220a and the second multipath component 220b that indicate the deterministic characteristic of the CIR estimate for the first multipath component 220a and the second multipath component 220b. The deterministic characteristic of the CIR estimate, or the CIR estimate, may be made for any segment of the data transmission 502, including the data segment 512a-c. Importantly, the step 630 may estimate a future state of the first multipath component 220a and the second multipath component 220b (e.g., CIR estimates of preceding probe segments 508a-b may be used to estimate subsequent data segments 512a-c).

In one or more embodiments, the method 600 includes a step 640 detecting data symbols from the received data signal based on the deterministic characteristic of the CIR for the first multipath component 220a and the second multipath component 220b. For example, the data processor module 316 may detect the data symbols from the probe segments 508a-c and the data segments 512a-b. The method 600 may also include steps of forming data blocks 500 (e.g., detection blocks), estimating symbols (e.g., data symbols), diversity combining, and other aspects of multipath reception and symbol detection may be established as detailed in Moreland.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A system comprising:
    An equalizer comprising:
        an input for a received data signal, wherein the received data comprises a first multipath component and a second multipath component;
        a channel impulse response estimator coupled to the input configured to determine one or more channel impulse response (CIR) estimates for the first multipath component and the second multipath component;
        a statistical estimation module coupled to the channel impulse response estimator configured to estimate a state of the first multipath component and the second multipath component based on the one or more channel impulse response estimates;
        a detector coupled to the statistical estimation module configured to detect data from the received data signal based on an estimated future state of the first multipath component and the second multipath component.

2. The system of claim 1, wherein the statistical estimation module comprises a Kalman tracking filter.

3. The system of claim 1, wherein the statistical estimation module comprises a prediction error filter.

4. The system of claim 3, wherein the prediction error filter is configured to estimate a future state of the first multipath component and the second multipath component.

5. The system of claim 4, wherein the prediction error filter is configured to estimate the future state of the first multipath component and the second multipath component based on two or more preceding CIR estimates for each of the first multipath component and the second multipath component.

6. The system of claim 1, wherein the first multipath component and the second multipath component vary in frequency.

7. The system of claim 1, further comprising a diversity combiner configured to receive a plurality of data signals.

8. The system of claim 1, further comprising a receiver configured to provide the received data to the equalizer.

9. The system of claim 1, wherein the first multipath component and the second multipath component are received from two different sources.

10. The system of claim 1, wherein the statistical estimation module is configured to estimate a state of the first multipath component and the second multipath component based on two or more CIR estimates.

11. A method for detecting a received data signal having a first multipath component and a second multipath component comprising;
    generating one or more CIR estimates for each of the first multipath component and the second multipath component;
    generating a deterministic characteristic of the CIR of the first multipath component and the second multipath component, wherein generating the deterministic characteristic of the CIR of the first multipath component and the second multipath component includes determining, via an error residual of a predicted state of the first multipath component and the second multipath component, at least one of an estimation of the first multipath component and the second multipath component, or a coefficient of the predicted state of the first multipath component and the second multipath component that indicate the deterministic characteristic of the CIR estimate for the first multipath component and the second multipath component; and
    detecting data symbols from the received data signal based on the deterministic characteristic of the CIR estimate for the first multipath component and the second multipath component.

12. The method of claim 11, further comprising generating a frequency offset correction of the received data signal.

13. The method of claim 11, wherein the error residual is determined as part of a Kalman tracking filter.

14. The method of claim 11, wherein the error residual is determined as part of a prediction error filter.

15. The method of claim 11, wherein the first multipath component and a second multipath component vary in frequency.

* * * * *